March 17, 1925.
C. W. ASHING
1,530,101
RATPROOF POULTRY FEEDER
Filed Oct. 22, 1923
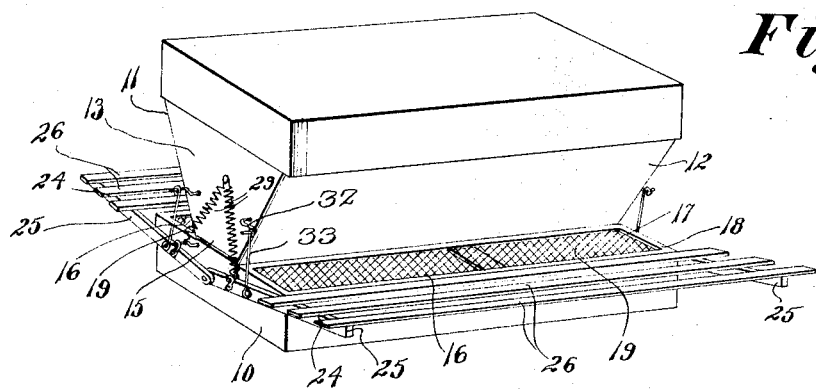
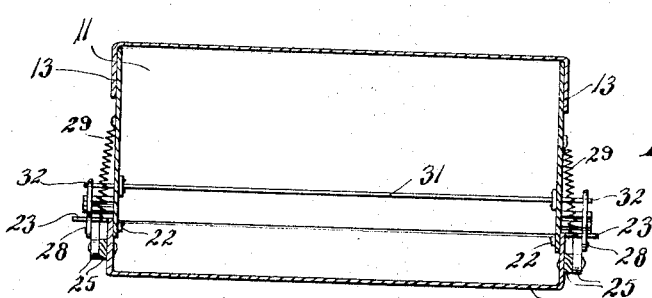
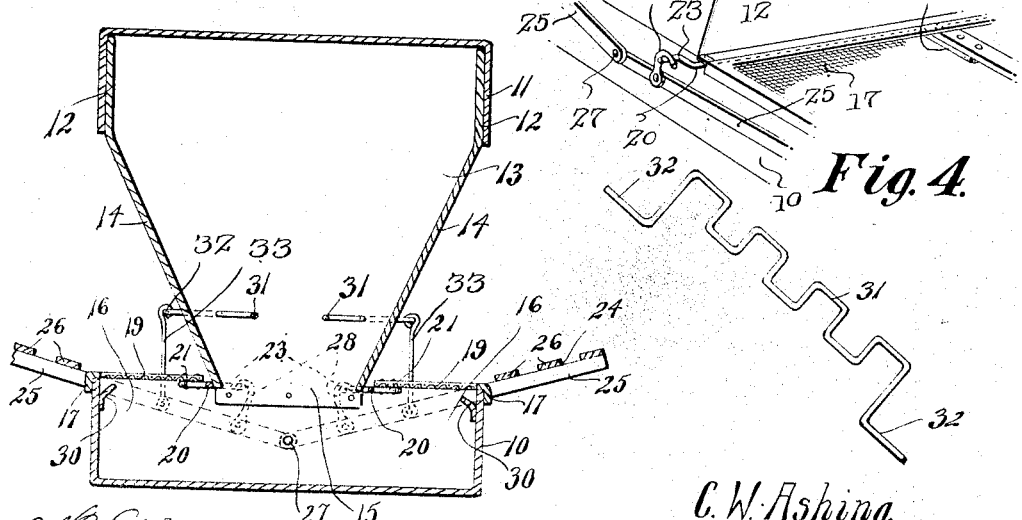
C. W. Ashing
INVENTOR
BY Victor J. Evans
ATTORNEY Patented Mar. 17, 1925.

1,530,101

UNITED STATES PATENT OFFICE.

CHARLES W. ASHING, OF LAUREL, IOWA.

RATPROOF POULTRY FEEDER.

Application filed October 22, 1923. Serial No. 670,166.

*To all whom it may concern:*

Be it known that I, CHARLES W. ASHING, a citizen of the United States, residing at Laurel, in the county of Marshall and State of Iowa, have invented new and useful Improvements in Ratproof Poultry Feeders, of which the following is a specification.

This invention relates to feeders for poultry and has for its object the provision of a device of this character provided with means for preventing access of rats, mice and the like thereto so that the feed will be kept in better condition and loss prevented.

An important and more specific object is the provision of a feeder provided with doors which normally cover the feed troughs but which are automatically opened when a chicken or the like steps on the approach treadles whereby access may be readily had to the feed.

Another object is the provision of means automatically actuated by movement of the treadles whereby to agitate the feed and prevent it from caking or packing.

An additional object is the provision of a device of this character which will be simple and inexpensive in manufacture, highly efficient in use, durable in service and a general improvement in the art.

With the above and other objects and advantages in view the invention consists in the details of construction to be hereinafter more fully described and claimed and illustrated in the accompanying drawings, in which:

Figure 1 is a perspective view of the device and

Figure 2 is a vertical section.

Figure 3 is a cross section,

Figure 4 is a detail view of the agitator.

Figure 5 is a fragmentary perspective view showing details.

Referring more particularly to the drawings the numeral 10 designates the bottom portion of the feeder which is relatively wide and from which rises a hopper 11. In actual practice this hopper includes sides 12 which are rectangular in shape and ends 13 which have their opposite edges converging downwardly as shown at 14 to define a constricted neck 15 at the juncture with the bottom portion 10. The lower portion 10 projects beyond the bottom of the hopper to define feed troughs 16 which are open at the top. So far the device does not differ from ordinary and well known feeders.

In carrying out the present invention I provide covers 17 for the troughs, each cover including a flanged frame 18 covered with wire screen 19. These covers are carried by rock shafts 20 which have their intermediate portions formed with lateral offsets 21 secured to the frames. The rock shafts are journaled in suitable bearings 22 and are formed at their ends with cranks 23.

Located at opposite sides of the feeder are treadles 24 each of which includes side bars 25 connected by slats 26. These treadles are pivoted at the center of the end portions 10 as shown at 27 and carry hooks 28 which engage the cranks 23. Connected with the cranks are coil springs 29 which normally hold the covers closed.

In the operation, the chickens or the like will be attracted by the feed which is visible through the wire screen cover and will step upon the treadles. The weight of the chicken will swing the treadle downwardly and move the crank 23 so that the shaft 20 will be rocked, thus moving the cover to open position. When the chicken has finished feeding, it will naturally step down from the treadle and the weight thereof combined with the action of the spring 29 will reclose the cover. The operation is of course exactly the same at both sides of the device. It is quite apparent that the covering of the troughs will prevent access of rats or mice thereto which will prevent ruining the feed and wasting thereof. While it is not necessary it is preferable to provide a strip 30 located as shown for preventing the chickens from scratching the feed out of the troughs.

A rather important feature is the provision of means for preventing packing of the feed. In carrying out this detail I provide an elongated shaft 31 located at each side of the hopper and journaled through the ends. This shaft is zigzag or serpentine in shape as clearly illustrated and has its ends formed with cranks 32 which are pivotally connected with the side bars 25 of the treadles by means of links 33. It is apparent that every time a chicken or the like steps on a treadle and lifts the cover the serpentine shaft 31 will be rocked slightly and will loosen the feed so as to insure proper discharge thereof into the troughs.

While I have shown and described the preferred embodiment of my invention it is of course to be understood that I reserve the right to make such changes in the form, construction and arrangement of parts as will not depart from the spirit of the invention or the scope of the subjoined claims.

Having thus described my invention I claim:

1. In a feeder including a hopper, troughs receiving from the hopper, and treadle operated covers normally closing the troughs, means for agitating feed within the hopper to prevent clogging, comprising a shaft journaled longitudinally of the hopper near the lower portion thereof and formed throughout its length with a plurality of crank portions located within the hopper, the ends of said shaft projecting beyond the ends of the hopper and being formed with other cranks, and links pivotally connected with the last named cranks and with the treadles whereby to rock said crank shaft when the treadle mechanism is operated.

2. In a feeder including a hopper and a pan therebelow projecting beyond the side thereof and having an open top, a shaft journally mounted at the lower portion of the hopper and having its ends formed with cranks, a cover carried by said shaft and normally closing the open top of the projecting portion of the pan, a treadle pivoted on the pan, a member on the treadle pivotally engaged with each crank, a plural crank shaft journaled through the hopper above the first named shaft and links pivotally connected with the treadle and with certain of the cranks of the plural crank shaft whereby to agitate the contents of the hopper simultaneously with opening movement of the cover on depression of the treadle.

In testimony whereof I affix my signature.

CHARLES W. ASHING.